(12) United States Patent
da Silva et al.

(10) Patent No.: US 6,347,099 B1
(45) Date of Patent: Feb. 12, 2002

(54) FIBER LASERS WITH SHARED PUMP

(75) Inventors: Valeria L. da Silva, Hillsborough, NJ (US); Michael J. Yadlowsky, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/355,420
(22) PCT Filed: Jan. 26, 1998
(86) PCT No.: PCT/US98/02227
§ 371 Date: Jul. 28, 1999
§ 102(e) Date: Jul. 28, 1999
(87) PCT Pub. No.: WO98/34306
PCT Pub. Date: Aug. 6, 1998

Related U.S. Application Data
(60) Provisional application No. 60/036,831, filed on Jan. 31, 1997.

(51) Int. Cl.[7] .............................. H01S 3/30; H01S 3/10
(52) U.S. Cl. .............................................. 372/6; 372/23
(58) Field of Search .............................................. 372/6

(56) References Cited

U.S. PATENT DOCUMENTS
| | | | |
|---|---|---|---|
| 5,323,404 A | * | 6/1994 | Grubb .............................. 372/6 |
| 5,497,265 A | * | 3/1996 | Fontana et al. .............. 359/341 |
| 5,524,118 A | * | 6/1996 | Kim et al. ...................... 372/6 |

* cited by examiner

*Primary Examiner*—James W. Davie
*Assistant Examiner*—Jeffrey Zahn
(74) *Attorney, Agent, or Firm*—William J. Chervenak

(57) ABSTRACT

A plurality of fiber lasers or amplifiers which share a common pump source. Cost and efficiency improvement of waveguide fiber telecommunications systems are made possible by routing pump laser power through a 1×N coupler to supply pump light to desired combinations of optical fiber lasers or amplifiers. The design is readily adapted to the use of modules, for example laser modules which have a port for receiving pump light and a port for receiving a wavelength selecting module.

18 Claims, 2 Drawing Sheets

FIBER LASERS WITH SHARED PUMP

This application claims benefit of Provisional No. 60/035,831, filed Jan. 31, 1997 and is a PCT/US98/02227 filed Jan. 22, 1998

BACKGROUND OF THE INVENTION

The invention is directed to optical waveguide fiber lasers configured to share a common source of pump light. The novel fiber laser configuration includes modular units for laser wavelength selection.

High performance telecommunication systems may be made more cost efficient by using wavelength division multiplexing (WDM). Usually, modifications are needed only at the receive and transmit ends of the system and perhaps at already existing regenerator stations. The waveguide fiber capability is more fully utilized and very high transmission rates are made possible without incurring the cost of installing additional waveguide fiber cables.

A major part of the cost of a fiber laser sources for use in WDM systems is the pump laser. The pump laser itself is expensive and the utilization of the pump power is usually less than optimum.

There is therefore a need in the telecommunications industry for a strategy to reduce pump laser cost by more fully utilizing the pump laser power. However, this more efficient use of pump laser power must not reduce the design flexibility of WDM systems. Thus a successful strategy for low cost system upgrade must include to some degree the notion of interchangeable parts, for example interchangeable and compatible modules which perform a specific communication system task.

SUMMARY OF THE INVENTION

The present invention meets the need for lower cost multiple wavelength laser sources and provides the additional flexibility of modular design.

A first aspect of the invention is an optical circuit made up of a plurality of optical waveguide fiber lasers which are coupled to a common pump laser by means of a 1×N optical coupler. The waveguide fiber is made a laser cavity by a reflective element at one end of the fiber and a means for wavelength selective feedback at the opposite end. To make the multiple wavelength laser source suitable for wavelength division multiplexing systems, a particular wavelength selective feedback means selects a wavelength different from that selected by each of the other wavelength selective feedback means. However, it is clear that one or more laser pairs may produce the same light wavelength if a particular system requires such a configuration.

Wavelength selective feedback means are devices which select light of a particular wavelength or wavelength band and direct the light back into the laser fiber. The selection means may be one in which a particular wavelength or wavelength band is reflected or transmitted. Devices which perform this function include a grating, a loop mirror, a bandpass filter, an etalon filter, an interferometric filter, a dielectric or metallic mirror, and combinations of these devices. The mirrors may be plane or curved.

A particularly useful feature of the novel optical circuit is the modular design of the circuit components. In this document modular means the optical device (module) has at least one input port for receiving light and at least one output port for transmitting light, except for source or detector modules which may have only one output or input port respectively.

The transmitting and receiving ports of different modules are compatible in that the input port of any module is equipped with optical connectors or couplers which can efficiently receive light from the output port of any other module. A large number of effective designs of optical connectors and couplers are available in the telecommunication art.

A further aspect of the novel optical circuit includes an external modulator optically coupled to a fiber laser to encode information into the laser light. Various embodiments of the optical circuit, including an external modulator, may be constructed by coupling of optical amplifiers into the circuit, either before or after the external modulator. The optical amplifiers are designed so that the same pump laser which supplies power to the fiber lasers may be coupled to supply pump light to the amplifiers as well.

The pump lasers are an expensive component in optical circuits which employ lasers or amplifiers. The circuit design in which light is distributed from a common pump laser to several optical fiber lasers or to several optical amplifiers makes most efficient use of the pump laser and thus significantly reduces circuit cost.

In addition, the concept of modular optical component design greatly enhances flexibility of the optical circuit. For example, the pump laser, the fiber lasers, the 1×N couplers, the modulators, or amplifiers, may each be made modular to provide maximum flexibility. As an alternative, groups of components such as a fiber laser, a wavelength selective feedback device and an amplifier may be made into a module for interface with another module, such as an external modulator, which provides for a particular circuit function. Further examples of alternative modular designs are presented below.

The silica based optical waveguide fiber has a window of low attenuation and can be made to have a coincident window of low dispersion over the wavelength range of about 1520 nm to 1575 nm. This operating window coincides with that of erbium doped fiber lasers and amplifiers and is therefore the preferred operating window for the novel optical circuits disclosed herein.

The devices for selective feedback of light are capable of discriminating between wavelengths separated by about 0.1 nm.

A further aspect of the invention is the use of the multiple fiber lasers, having a common pump source, together with external modulators to form a transmitter for use in a wavelength division multiplexed system. The width of the operating window and the capabilities of the wavelength selective feedback devices provide the opportunity for multiplexing a large number of signals onto a single waveguide fiber.

DETAILED DESCRIPTION OF THE INVENTION

Figure 1:
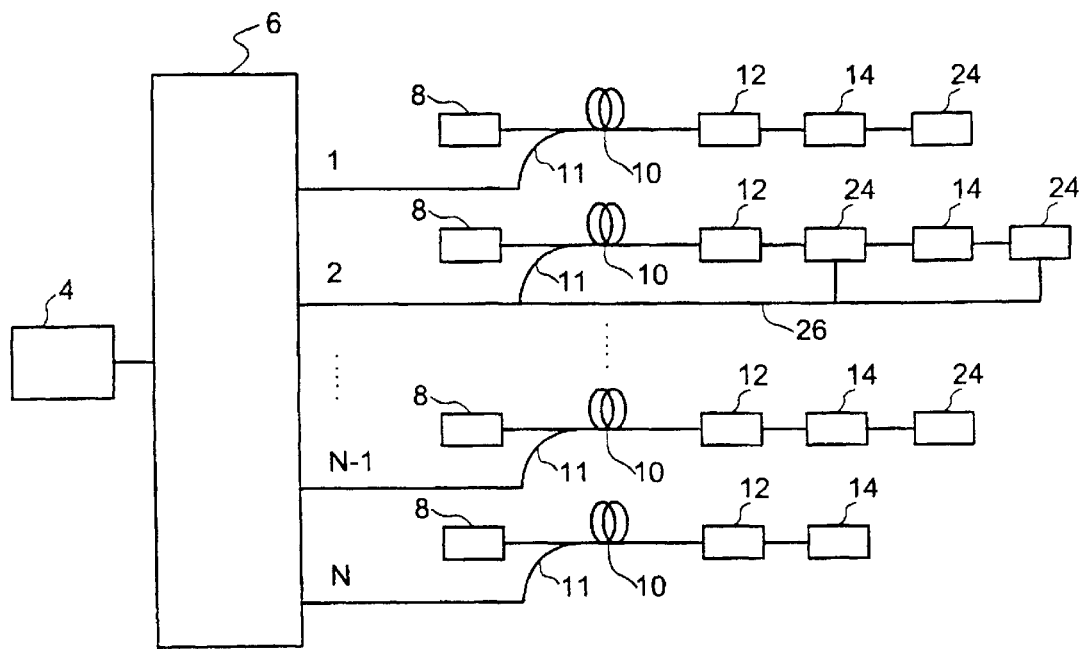
FIG. 1 is a schematic representation of multiple fiber lasers having a common pump and alterative modular units connected to the respective laser outputs.

A multiple laser optical circuit in which the lasers share a pump source is shown in FIG. 1. Pump laser 4 is coupled to N lasers, labelled 1 through N, by means of a 1×N splitter. N is an integer which is limited only by the available pump power and the power requirements of lasers and amplifiers using the pump light. The lasers each include an active optical fiber 10 having a reflector 8 at one end and a wavelength selective reflector or filter 12, to feed back a particular light wavelength into the active fiber, at the other end. The wavelength selective reflector 12 can be changed to feed back, in different lasers, a different one of the plurality of wavelengths generated by the plurality of possible electron transitions which result from doping the waveguide fiber. The active species in the laser fiber may be erbium, which is chosen because it provides transitions which emit light in the wavelength range 1520 nm to 1575 nm. This wavelength range is coincident with the low attenuation window of the silica based waveguide fiber. Thus, the circuit of FIG. 1 is readily configured as a wavelength division multiplexing (WDM) light source for use in this preferred wavelength window.

The pump light is coupled into the respective lasers at points 11. The insertion point of the pump light is not important provided the point lies between the reflector 8 and the wavelength selective reflector 12. A typical reflector 8 has an efficiency near 100%. The wavelength selective reflector 12 is partially transmitting to provide an exit for the laser light. One skilled in the art will understand that either of the reflectors may also be wavelength selective. That is, the percent reflectivity is independent of wavelength selectivity feature. An external modulator 14 serves to transform the laser light into light signals which carry information. Optical amplifiers 24 may be inserted into the optical circuit before or after the external modulator 14. The optical amplifiers advantageously can receive pump energy from common pump 4 through the optical waveguide 26 associated with the second laser from the top of FIG. 1. The pump waveguides for the other optical amplifiers in the circuit of FIG. 1 are not shown.

Figure 2:
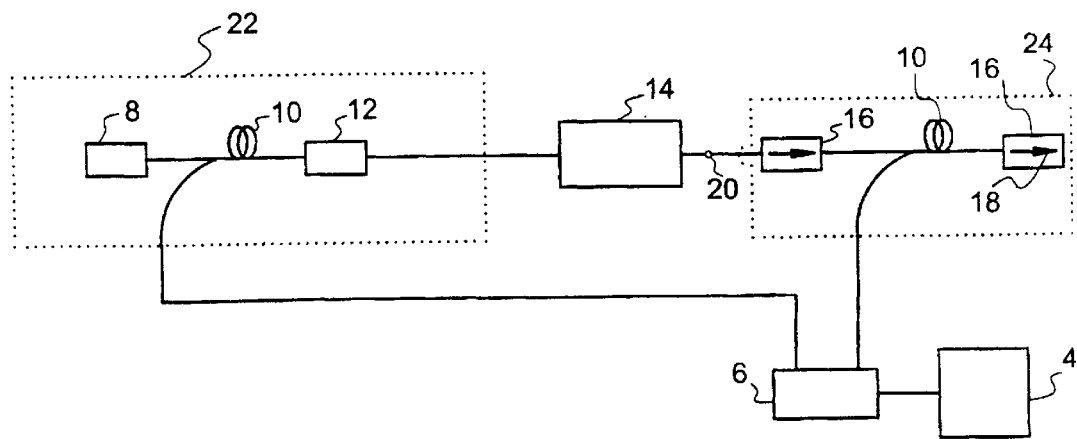
FIGS. 2 and 3 are more detailed schematics of a respective one of the fiber lasers of FIG. 1.

FIG. 2 shows a modular embodiment of one branch of the optical circuit of FIG. 1. The branch contains one fiber laser shown as module 22. The module has an input port to receive pump light from pump source 4 and splitter 6 and an output port which is coupled to an external modulator 14. An optical amplifier module 24 is coupled to the output of modulator 14. The branch optical circuit of FIG. 2 may be assembled by making five optical connections, a task which has been simplified by advances in connector and coupler design.

A benefit in terms of flexibility can be derived by decreasing the number of components in a module. For example, the laser module 22 can be separated into two modules, one containing the pump, the splitter, the active fiber and the reflector 8, and another containing the selective wavelength reflector. The wavelength of the laser could thus be changed by connecting a different wavelength selective module. The splitter can be modularized so that the number of lasers sharing a pump could be changed by inserting a splitter, having a different N value, between a pump module and the N laser modules. The novel concept of modular parts in a WDM system includes the large number of simple and complex modules which are tailored to fit particular system requirements.

Figure 3:
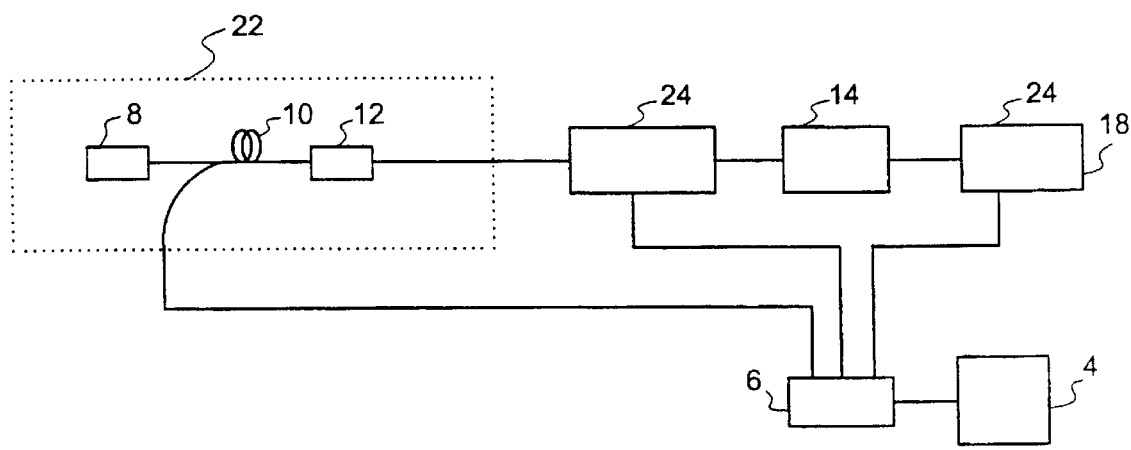

Another embodiment of a single laser branch of the optical circuit of FIG. 1 is given in FIG. 3. In this case, two amplifier modules 24, on either side of external modulator 14, share the common pump 4. A useful modular design of this embodiment is a first module containing the pump 4 and splitter 6, a second module 22 containing the laser, and a third module containing the two optical amplifiers and the external modulator.

Figure 4:
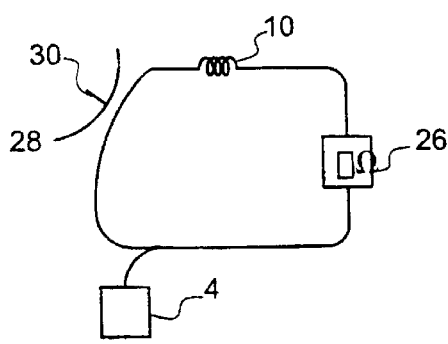
FIG. 4 is an illustration of a ring fiber laser configuration.

The design of the laser itself encompasses numerous alternatives. A ring laser design is shown in FIG. 4. In this case the feedback is provided by the waveguide path which closes upon itself. The wavelength selective absorber 26 is chosen to absorb wavelengths other than a preselected one at which laser light is to be generated. The pump 4 is coupled into the ring at an arbitrary point. Laser light is coupled out of the ring containing the active fiber 10 into waveguide 28 by means of a coupler 30. The position of coupler 30 on the ring is in general not important.

Figure 5:
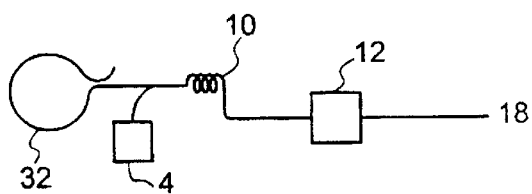
FIG. 5 is an illustration of a fiber laser in which one reflecting element is a non-linear loop mirror.

In another laser embodiment, FIG. 5, the reflective means at on end of the fiber laser is a non-linear optical loop mirror 32. Here again pump 4 is coupled to the fiber laser at an arbitrary point. Light of a selected wavelength passes through the partially reflecting, wavelength selective device 12 into output waveguide 18.

Figure 6:
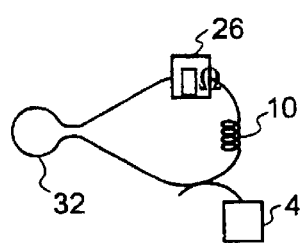
FIG. 6 is an illustration of a figure eight fiber laser.

An alternative embodiment using a non-linear optical loop mirror 32 is shown in FIG. 6. The end of the loop mirror is coupled through absorbing filter 26 to the active fiber 10, thereby forming a figure eight shaped laser cavity. Pump 4 is coupled into the laser waveguide at an arbitrary point. Laser light can be coupled out of the laser waveguide at essentially any convenient point.

The modularized and connectorized design of the components of the optical circuits described herein affords the flexibility of easily adding passive or active optical components to the circuit such as optical switches or filters, optical attenuators, and dispersion compensating means such as a specially configured waveguide fiber.

Although particular embodiments of the invention have been disclosed and described, the invention is nonetheless limited only by the following claims.

We claim:

1. An optical circuit for providing laser light at a plurality of wavelengths, comprising:
    a plurality of active fiber lasers, each said laser having a first and a second end, the first end having a reflective optical element;
    a pump laser to provide a common pumping source for the fiber lasers;
    a 1×N coupler, wherein N is an integer, for coupling light from the common pump laser into each of the active fiber lasers; and,
    means for selective feedback to the fiber laser of a wavelength, characteristic of the active fiber lasers, optically coupled to the respective second ends of the fiber lasers.

2. The optical circuit of claim 1 wherein the selective feedback wavelength is different for each of the plurality of fiber lasers.

3. The optical circuit of claim 1 wherein the means for selective feedback of a wavelength is selected from the group consisting of a grating, a loop mirror, an etalon filter, an interferometric filter, a dielectric or metallic mirror, and combinations of these.

4. The optical circuit of claim 3 wherein the means for selective feedback of a wavelength is a modular unit which may be optically connected and disconnected from the second end of the fiber laser.

5. The optical circuit of claim 1 further including external modulating means optically coupled to at least one fiber laser for modulating the light output of the fiber laser.

6. The optical circuit of claim 5 further including at least one optical amplifier optically coupled to receive signal light from an external modulating means and pump light from the common pump laser.

7. The optical circuit of claim 5 further including at least one optical amplifier optically coupled between a fiber laser and the corresponding external modulating means, to amplify and transmit laser light to the external modulator, and optically coupled to receive pump light from the common pump laser.

8. The optical circuit of claim 6 further including at least one optical amplifier optically coupled between a fiber laser and the corresponding external modulating means, to amplify and transmit laser light to the external modulator, and optically coupled to receive pump light from the common pump laser.

9. The optical circuit of claim 8 wherein any of the plurality of fiber lasers, the 1×N couplers, the means for selective feedback of a wavelength, the external modulating means, and the optical amplifiers are modular.

10. The optical circuit of claim 1 wherein the different selective feedback wavelengths are in the range of about 1520 nm to 1575 nm and are separated each from any other by a pre-selected amount.

11. The optical circuit of claim 10 wherein the pre-selected amount of wavelength separation is not less than 0.1 nm.

12. A wavelength division multiplexed optical system, comprising:
   an optical circuit, in accordance with claim 1, for providing laser light at a plurality of wavelengths from a plurality of waveguide fiber lasers; and,
   a plurality of external modulating means optically coupled to a respective one of each of the fiber lasers to modulate the light emerging therefrom.

13. The wavelength division multiplexed optical system of claim 12 further including at least one optical amplifier optically coupled to receive output light from a fiber laser and pump light from the common pump laser.

14. The wavelength division multiplexed optical system of claim 12 further including at least one optical amplifier optically coupled to receive fiber laser light from the external modulating means and pump light from the common pump laser.

15. The wavelength division multiplexed optical system of claim 12 further including, for a pre-selected number of fiber lasers and external modulating means combinations, respective optical amplifiers optically coupled to receive signal light from the external modulating means and pump light from the common pump laser, and respective optical amplifiers optically coupled between the respective fiber lasers and external modulating means and optically coupled to receive pump light from the common pump laser.

16. The wavelength division multiplexed optical system of claim 15 wherein any of the plurality of fiber lasers, the 1×N coupler, the means for selectively reflecting a wavelength, the external modulating means, and the optical amplifiers are modular.

17. The wavelength division multiplexed optical system of either of claims 14 or 15 further including one or more modular units, optically coupled to transmit light from at least one of the fiber lasers, selected from the group consisting of an optical waveguide dispersion compensator, an optical filter, an optical attenuator and an optical switch.

18. The wavelength division multiplexed optical system of claim 12 wherein the output wavelengths of the fiber lasers lie in the range of about 1520 nm to 1575 nm and are separated each from every other by no less than 0.1 nm.

* * * * *